(12) United States Patent
Tsuzaki et al.

(10) Patent No.: US 7,527,697 B2
(45) Date of Patent: May 5, 2009

(54) PROCESS FOR REMOVING WATER AND APPARATUS FOR REMOVING WATER

(75) Inventors: Masaaki Tsuzaki, Ichihara (JP); Tsuyoshi Hanada, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 176 days.

(21) Appl. No.: 11/480,368

(22) Filed: Jul. 5, 2006

(65) Prior Publication Data

US 2006/0249179 A1 Nov. 9, 2006

Related U.S. Application Data

(63) Continuation of application No. PCT/JP2005/003017, filed on Feb. 24, 2005.

(30) Foreign Application Priority Data

Feb. 24, 2004 (JP) ............................ 2004-048427

(51) Int. Cl.
*B08B 3/04* (2006.01)
(52) U.S. Cl. .................. 134/10; 210/799; 210/804; 210/805; 210/DIG. 5
(58) Field of Classification Search .................. 134/10
See application file for complete search history.

(56) References Cited

U.S. PATENT DOCUMENTS

| 3,104,222 | A | * | 9/1963 | Fuehring | .................. 210/207 |
| 4,753,735 | A | * | 6/1988 | Figiel | .................. 210/664 |
| 5,124,065 | A | | 6/1992 | Magid et al. | |
| 5,346,645 | A | | 9/1994 | Omure et al. | |
| 5,782,983 | A | | 7/1998 | Inada et al. | |
| 2006/0249179 | A1 | | 11/2006 | Tsuzaki et al. | |

FOREIGN PATENT DOCUMENTS

| JP | 5-500979 | 2/1993 |
| JP | 5-154302 | 6/1993 |
| JP | 7-121322 | 12/1995 |
| JP | 8-117503 | 5/1996 |
| JP | 8-155205 | 6/1996 |
| JP | 8-259995 | 10/1996 |
| JP | 2002-355502 | 12/2002 |
| WO | WO 93/04755 | 3/1993 |

OTHER PUBLICATIONS

U.S. Appl. No. 11/692,311, filed Mar. 28, 2007, Nagase, et al.

* cited by examiner

*Primary Examiner*—Peter A Hruskoci
(74) *Attorney, Agent, or Firm*—Oblon, Spivak, McClelland, Maier & Neustadt, P.C.

(57) ABSTRACT

To provide a process for removing water, capable of maintaining good water removal performance for a long time continuously and constantly. A process for removing water, which comprises a dipping step of dipping an article having water attached on its surface, in a solvent composition comprising at least one member selected from a hydrochlorofluorocarbon, a hydrofluorocarbon and a hydrofluoroether, and an alcohol, as the essential components, to carry out removal of water, a specific gravity separation step of separating water from the solvent composition containing the water removed from the article, by a specific gravity separation method, and a filtration step of filtering the solvent composition having the water removed in the specific gravity separation step, through a coalescer type filter to further remove water remaining in the solvent composition.

15 Claims, 1 Drawing Sheet

PROCESS FOR REMOVING WATER AND APPARATUS FOR REMOVING WATER

TECHNICAL FIELD

The present invention relates to a process for removing water, to remove water attached to the surface of an article. In this specification, removal of water means to remove water from an article having the water attached on its surface and includes such operation modes as draining, dewatering and drying.

BACKGROUND ART

Articles to be used for various applications, such as wafers to be used for the production of semiconductors, masks to be used in photolithography, plated products, optical parts such as lenses, parts of liquid crystal display devices, or various electronic parts, are usually cleaned by being washed with water such as pure water or rinsed with water such as pure water after being washed with an aqueous cleaning agent or a semi-aqueous cleaning agent in their production processes. In such a case, if water remains on the surface of such an article after the cleaning, it is likely to cause a defect on appearance due to formation of stains or a defect in performance due to formation of rust. Accordingly, it is important to completely remove water from the surface of the article.

As a method for removing such water, a method is known wherein the article to be cleaned is dipped in a solvent capable of removing water from the surface of the article to be cleaned, and after taking it out, the solvent is dried. As the solvent to be employed in this method, an alcohol such as ethanol or isopropyl alcohol is known. However, such an alcohol is a compound having a flash point, and accordingly, it was required to pay attention to the working environment. Further, as such a solvent, a solvent composition is also known which has an alcohol or a surfactant added to a chlorofluorocarbon (hereinafter referred to as CFC). However, CFC is a compound, the production of which has been completely banned since 1996 in developed countries, since its influence to ozone depletion in the stratosphere was pointed out.

As a substitute for CFC, hydrochlorofluorocarbons (hereinafter referred to as HCFC), hydrofluorocarbons (hereinafter referred to as HFC) or hydrofluoroethers (hereinafter referred to as HFE) have, for example, been developed, and solvent compositions having alcohols added to such compounds, have been proposed also in applications to removal of water after the cleaning as mentioned above.

Such a solvent composition shows good water removal performance at the initial stage, but has had a problem that when it is used for a long period of time continuously, water is taken into the solvent compositions and suspended. Namely, for the purpose of removing water in a short time when the article to be cleaned is dipped in the solvent composition, a method of forcibly stirring water by ultrasonic cleaning, vibration cleaning or jet cleaning, or for the purpose of removing water surfaced to the liquid surface in the dipping tank for dewatering, a means to recycle the solvent composition may be provided, whereby water is forcibly stirred to form a suspension.

If the proportion of water suspended in the solvent composition becomes large, water tends to remain on the surface of the article to be cleaned, thus leading to a problem of formation of stains on the object to be cleaned.

As a method to solve such a problem, a method has been proposed wherein a porous fluororesin paper which permits a solvent to pass therethrough but does not permit water to pass therethrough, is disposed in the flow path of the solvent after treatment for removal of water, to prevent passage of water suspended in the solvent thereby to separate the water (JP-A-2002-355502). However, such a method has a problem that in a case where the proportion of water suspended in the solvent is high, the speed of the solvent passing through the porous fluororesin paper tends to be low, and when the solvent composition is recycled, an adequate amount of recycling can not be maintained.

DISCLOSURE OF THE INVENTION

It is an object of the present invention to provide a process for removing water and an apparatus for removing water, whereby good water removal performance can be maintained for a long time continuously and constantly without the above-mentioned problems.

Namely, the present invention provides a process for removing water, which comprises a dipping step of dipping an article having water attached on its surface, in a solvent composition comprising at least one member selected from a hydrochlorofluorocarbon, a hydrofluorocarbon and a hydrofluoroether, and an alcohol, as the essential components, to carry out removal of water, a specific gravity separation step of separating water from the solvent composition containing the water removed from the article, by a specific gravity separation method, and a filtration step of filtering the solvent composition having the water removed in the specific gravity separation step, through a coalescer type filter to further remove water remaining in the solvent composition.

Further, the present invention provides an apparatus for removing water, which comprises a dipping tank for storing a solvent composition comprising at least one member selected from a hydrochlorofluorocarbon, a hydrofluorocarbon and a hydrofluoroether, and an alcohol, as the essential components, and for dipping an article having water attached on its surface in the solvent composition to carry out removal of water, a specific gravity separation tank for separating water from the solvent composition containing the water removed from the article, by a specific gravity separation method, and a coalescer type filter for filtering the solvent composition having the water removed in the specific gravity separation step, to further remove water remaining in the solvent composition.

Here, the coalescer type is a type wherein an oil/water mixed liquid is contacted to the surface of a membrane made of very fine fibers to capture, aggregate and coarse water or oil dispersed in the mixed liquid. In the present invention, the filtration step by the coalescer type filter is carried out after the specific gravity separation step, whereby it is possible to reduce water remaining as dispersed in the solvent composition to a low level.

According to the present invention, in the process for removing water employing the solvent composition for removal of water, comprising at least one member selected from HCFC, HFC and HFE, and an alcohol, as the essential components, good water removal performance can be maintained for a long time continuously and constantly.

BRIEF DESCRIPTION OF DRAWING

In FIG. 1, reference numeral 1 represents a dipping tank, 2 a specific gravity separation tank, 3 a coalescer type filtration separator, a vapor-generating tank, 5 a pump, 6,9 a trough, 7 a ultrasonic vibrator, 8 a cooling pipe, and 10, 11, 12 a heater.

BEST MODE FOR CARRYING OUT THE INVENTION

Figure 1:
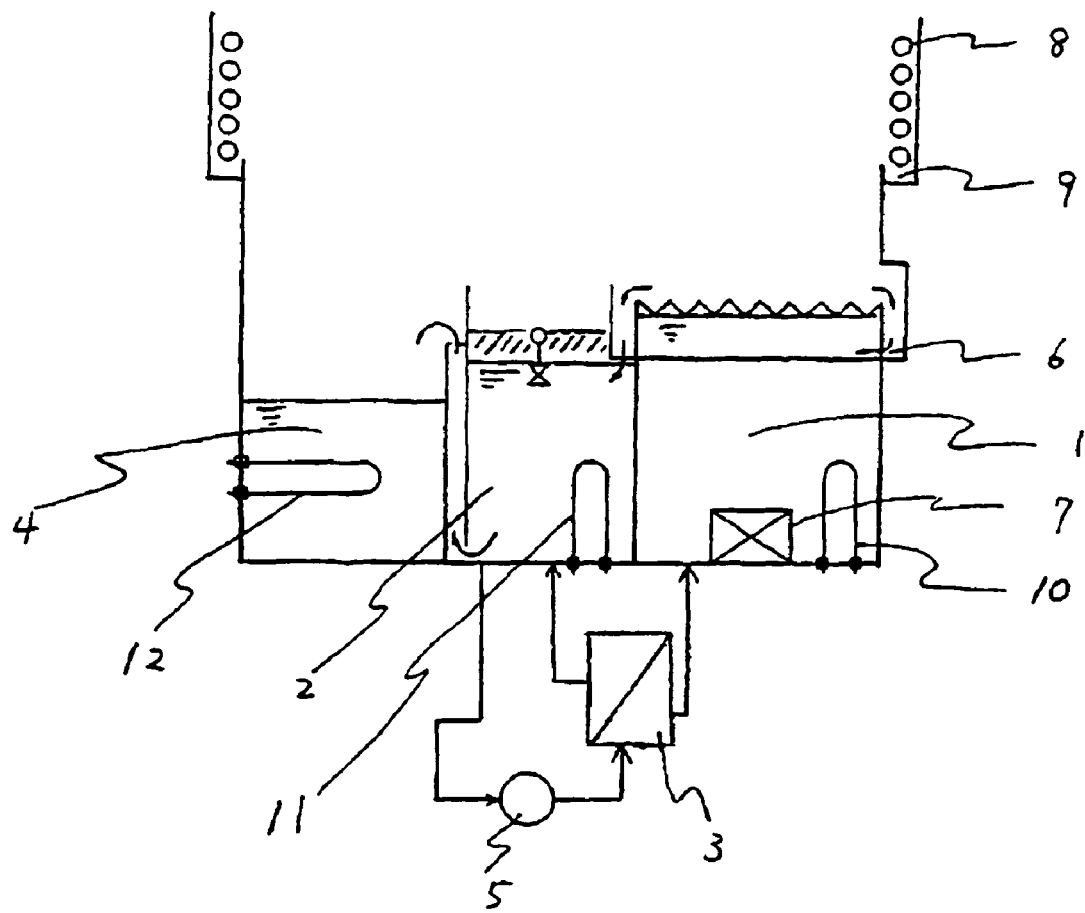
FIG. 1 is a schematic view of an apparatus used in a water removal test employing the process for removing water of the present invention.

The solvent composition in the present invention comprises at least one member selected from HCFC, HFC and HFE, and an alcohol, as the essential components.

Specifically, HCFC includes, for example, 2,2-dichloro-1,1,1-trifluoroethane, 1,1-dichloro-1-fluoroethane, 3,3-dichloro-1,1,1,2,2-pentafluoropropane and 1,3-dichloro-1,1,2,2,3-pentafluoropropane. Among them, 1,1-dichloro-1-fluoroethane, 3,3-dichloro-1,1,1,2,2-pentafluoropropane and 1,3-dichloro-1,1,2,2,3-pentafluoropropane are preferred. They may be used alone or in combination as a mixture of two or more of them.

HFC includes compounds represented by $C_4F_5H_5$, $C_4F_7H_3$, $C_4F_8H_2$, $C_4F_9H$, $C_5F_6H_6$, $C_5F_7H_5$, $C_5F_8H_4$, $C_5F_9H_3$, $C_5F_{10}H_2$, $C_5F_{11}H$, $C_6F_7H_7$, $C_6F_8H_6$, $C_6F_9H_5$, $C_6F_{10}H_4$, $C_6F_{11}H_3$, $C_6F_{12}H_2$ and $C_6F_{13}H$, and cyclic $C_5F_7H_3$.

Specifically, HFC includes, for example, the following compounds:

1,1,1,3,3-Pentafluorobutane, 1,1,2,3,4,4-hexafluorobutane, 2-methyl-1,1,1,3,3,3-hexafluoropropane, 1,2,2,3,3,4-hexafluorobutane, 1,1,1,2,3,3,4-heptafluorobutane, 1,1,2,2,3,4,4-heptafluorobutane, 1,1,1,2,3,4,4-heptafluorobutane, 1,1,2,2,3,3,4-heptafluorobutane, 1,1,1,2,3,3,4,4-octafluorobutane, 1,1,1,2,2,3,3,4-octafluorobutane, 1,1,2,2,3,3,4,4-octafluorobutane, 1,1,1,2,2,3,3,4,4-nonafluorobutane and 1,1,1,2,2,3,4,4,4-nonafluorobutane.

1,1,2,3,3,4,5,5-Octafluoropentane, 1,1,1,2,2,5,5,5-octafluoropentane, 1,1,2,2,3,3,4,4,5-nonafluoropentane, 1,1,1,2,3,3,4,4,5-nonafluoropentane, 1,1,1,2,2,4,5,5,5-nonafluoropentane, 1,1,1,2,2,3,5,5,5-nonafluoropentane, 1,1,1,2,3,3,4,4,5,5-decafluoropentane, 1,1,1,2,2,3,3,4,5,5-decafluoropentane, 1,1,1,2,2,3,4,5,5,5-decafluoropentane, 1,1,1,2,2,4,4,5,5,5-decafluoropentane, 1,1,1,2,2,3,3,4,4,5,5-undecafluoropentane, 1,1,1,2,2,3,3,4,5,5,5-undecafluoropentane and 1,1,1,2,2,3,3,4,4-nonafluorohexane.

2-Trifluoromethyl-1,1,1,2,4,4-hexafluorobutane, 1,1,1,2,2,5,5,6,6,6-decafluorohexane, 2-trifluoromethyl-1,1,1,3,4,5,5-heptafluoropentane, 2-trifluoromethyl-1,1,1,2,3,4,5-heptafluoropentane, 2-trifluoromethyl-1,1,1,2,3,3,4,4-octafluorobutane, 2-trifluoromethyl-1,1,1,3,4,5,5,5-nonafluoropentane, 2-trifluoromethyl-1,1,1,2,3,4,5,5-octafluoropentane and 2-trifluoromethyl-1,1,1,2,3,5,5,5-octafluoropentane.

1,1,2,2,3,3,4,4,5,5,6,6-Dodecafluorohexane, 2-trifluoromethyl-1,1,1,3,4,4,5,5,5-nonafluoropentane, 2-trifluoromethyl-1,1,1,2,3,4,5,5,5-nonafluoropentane, 1,1,1,2,2,3,3,4,4,5,5,6,6-tridecafluorohexane, 1,1,2,2,3,3,4,4,5,6,6,6-tridecafluorohexane and 1,1,2,2,3,3,4-heptafluorocyclopentane.

Among them, 1,1,1,3,3-pentafluorobutane, 1,1,1,2,2,3,4,5,5,5-decafluoropentane, 1,1,1,2,2,3,3,4,4-nonafluorohexane, 2-trifluoromethyl-1,1,1,2,3,4,5,5,5-nonafluoropentane and 1,1,1,2,2,3,3,4,4,5,5,6,6-tridecafluorohexane are preferred. They may be used alone or in combination as a mixture of two or more of them.

As HFE, a compound represented by the formula 1 is preferred $$R^1\!-\!O\!-\!R^2 \qquad \text{Formula 1}$$

In the above formula 1, each of $R^1$ and $R^2$ which are independent of each other, is an alkyl group or a fluorinated alkyl group. The number of fluorine atoms contained in $R^1$ and $R^2$ is not simultaneously 0, and the total number of carbon atoms contained in $R^1$ and $R^2$ is from 4 to 8.

Among them, 1,1,2,2-tetrafluoroethyl-2,2,2-trifluoroethyl ether, 2,2,3,3-tetrafluoro-1-(1,1,2,2-tetrafluoroethoxy)propane, (perfluorobutoxy)methane and (perfluorobutoxy)ethane are preferred, and they may be used alone or in combination as a mixture of two or more of them.

As the alcohol, ally alcohol or an alkanol may, for example, be used. Among them, a $C_{1-4}$ alkanol is preferred, and methanol, ethanol or isopropyl alcohol is particularly preferred. They may be used alone or in combination as a mixture of two or more of them.

In the present invention, if the content of the alcohol in the solvent composition is too small, it tends to be difficult to remove water from the surface of an article having the water attached on its surface, when the article is dipped in the solvent composition, and water tends to remain on the surface when the article is withdrawn, thus leading to formation of stains. On the other hand, if the content of the alcohol is too large, the solvent composition tends to be a composition having a flash point, whereby its handling tends to be cumbersome. Further, the concentration of the alcohol contained in the water surfacing as removed from the surface of the article tends to be high, and at the same time the content of the alcohol in the solvent composition tends to decrease, whereby it tends to be difficult to maintain the water removal performance. Further, if the concentration of the alcohol contained in the water to be discharged, becomes high, the load for the treatment of the water also increases. From such a viewpoint, the content of the alcohol in the solvent composition in the present invention is preferably from 1 to 20 mass %, particularly preferably from 3 to 15 mass %.

Further, with respect to the content of the alcohol, in a case where HCFC, HFC or HFE, and the alcohol will form an azeotropic composition, it is possible to control the compositional change during evaporation. Accordingly, it is most preferred to employ such an azeotropic composition as the solvent composition.

From the foregoing, specific examples preferred as the solvent composition in the present invention will be shown in Table 1.

TABLE 1

| Composition of solvent mixture<br>Mass % in brackets | Boiling point (° C.) |
|---|---|
| 1,1-Dichloro-1-fluoroethane (96.1)/methanol (3.3) | 30 |
| 1,3-Dichloro-1,1,2,2,3-pentafluoropropane (95.6)/ethanol (4.4) | 55 |
| 3,3-Dichloro-1,1,1,2,2-pentafluoropropane (41.1)/1,3-dichloro-1,1,2,2,3-pentafluoropropane (54.4)/ethanol (4.5) | 52 |
| 1,1,1,2,2,3,4,5,5,5-Decafluoropentane (94)/methanol (6) | 48 |
| 1,1,1,2,2,3,4,5,5,5-Decafluoropentane (96)/ethanol (4) | 52 |
| 1,1,1,2,2,3,4,5,5,5-Decafluoropentane (97)/2-propanol (3) | 52 |
| 1,1,1,2,2,3,3,4,4-Nonafluorohexane (88)/methanol (12) | 49 |
| 1,1,1,2,2,3,3,4,4-Nonafluorohexane (91)/ethanol (9) | 58 |
| 1,1,1,2,2,3,3,4,4-Nonafluorohexane (90)/2-propanol (10) | 60 |
| 1,1,1,2,2,3,3,4,4,5,5,6,6-Tridecafluorohexane (89)/methanol (11) | 52 |
| 1,1,1,2,2,3,3,4,4,5,5,6,6-Tridecafluorohexane (91)/ethanol (9) | 61 |
| 1,1,1,2,2,3,3,4,4,5,5,6,6-Tridecafluorohexane | 64 |

TABLE 1-continued

| Composition of solvent mixture<br>Mass % in brackets | Boiling<br>point (° C.) |
|---|---|
| (91)/2-propanol (9) | |
| 1,1,2,2-Tetrafluoroethyl-2,2,2-trifluoroethyl ether (92)/methanol (8) | 46 |
| 1,1,2,2-Tetrafluoroethyl-2,2,2-trifluoroethyl ether (94)/ethanol (6) | 54 |
| 1,1,2,2-Tetrafluoroethyl-2,2,2-trifluoroethyl ether (96)/2-propanol (4) | 55 |
| (Perfluorobutoxy)methane (95)/2-propanol (5) | 55 |

To the solvent composition in the present invention, other components may be contained depending upon various purposes. For example, in order to increase the solubility or to control the evaporation speed, an organic solvent (hereinafter referred to as another organic solvent) other than HCFC, HFC, HFE and the alcohol, may be contained.

As such another organic solvent, at least one member selected from the group consisting of hydrocarbons, ketones, ethers containing no halogen atoms, esters and halogenated hydrocarbons other than HCFC and HFC, may be employed. The content of such another organic solvent is preferably a content at which the purpose can be achieved within a range not to impair the water removal performance of the solvent composition, and specifically from 1 to 20 mass %, particularly preferably from 2 to 10 mass %, in the solvent composition.

As the hydrocarbons, $C_{5-15}$ linear or cyclic saturated or unsaturated hydrocarbons are preferred, such as n-pentane, 2-methylbutane, n-hexane, 2-methylpentane, 2,2-dimethylbutane, 2,3-dimethylbutane, n-heptane, 2-methylhexane, 3-methylhexane, 2,4-dimethylpentane, n-octane, 2-methylheptane, 3-methylheptane, 4-methylheptane, 2,2-dimethylhexane, 2,5-dimethylhexane, 3,3-dimethylhexane, 2-methyl-3-ethylpentane, 3-methyl-3-ethylpentane, 2,3,3-trimethylpentane, 2,3,4-trimethylpentane, 2,2,3-trimethylpentane, 2-methylheptane, 2,2,4-trimethylpentane, n-nonane, 2,2,5-trimethylhexane, n-decane, n-dodecane, 1-pentene, 2-pentene, 1-hexene, 1-octene, 1-nonene, 1-decene, cyclopentane, methylcyclopentane, cyclohexane, methylcyclohexane, ethylcyclohexane, bicyclohexane, cyclohexene, α-pinene, dipentene, decalin, tetralin and amylnaphthalene. More preferred is, for example, n-pentane, cyclopentane, n-hexane, cyclohexane or n-heptane.

The ketones are preferably $C_{3-9}$ linear or cyclic saturated or unsaturated ketones. Specifically, they include, for example, acetone, methyl ethyl ketone, 2-pentanone, 3-pentanone, 2-hexanone, methyl isobutyl ketone, 2-heptanone, 3-heptanone, 4-heptanone, diisobutyl ketone, mesityl oxide, phorone, 2-octanone, cyclohexanone, methylcyclohexanone, isophorone, 2,4-pentanedione, 2,5-hexanedione, diacetone alcohol and acetophenone. More preferred is, for example, acetone or methyl ethyl ketone.

The ethers containing no halogen atoms are preferably $C_{2-8}$ linear or cyclic saturated or unsaturated ethers, such as diethyl ether, dipropyl ether, diisopropyl ether, dibutyl ether, ethyl vinyl ether, butyl vinyl ether, anisole, phenetole, methylanisole, dioxane, furan, methylfuran and tetrahydrofuran. More preferred is, for example, diethyl ether, diisopropyl ether, dioxane or tetrahydrofuran.

The esters are preferably $C_{2-19}$ linear or cyclic saturated or unsaturated esters. Specifically, they include, for example, methyl formate, ethyl formate, propyl formate, butyl formate, isobutyl formate, pentyl formate, methyl acetate, ethyl acetate, propyl acetate, isopropyl acetate, butyl acetate, isobutyl acetate, sec-butyl acetate, pentyl acetate, methoxybutyl acetate, sec-hexyl acetate, 2-ethylbutyl acetate, 2-ethylhexyl acetate, cyclohexyl acetate, benzyl acetate, methyl propionate, ethyl propionate, butyl propionate, methyl butyrate, ethyl butyrate, butyl butyrate, isobutyl isobutyrate, ethyl 2-hydroxy-2-methylpropionate, methyl benzoate, ethyl benzoate, propyl benzoate, butyl benzoate, benzyl benzoate, γ-butyrolactone, diethyl oxalate, dibutyl oxalate, dipentyl oxalate, diethyl malonate, dimethyl maleate, diethyl maleate, dibutyl maleate, dibutyl tartarate, tributyl citrate, dibutyl sebacate, dimethyl phthalate, diethyl phthalate, and dibutyl phthalate. More referred is, for example, methyl acetate or ethyl acetate.

The halogenated hydrocarbons other than HCFC and HFC, are preferably $C_{1-6}$ saturated or unsaturated chlorinated hydrocarbons, such as methylene chloride, 1,1-dichloroethane, 1,2-dichloroethane, 1,1,2-trichloroethane, 1,1,1,2-tetrachloroethane, 1,1,2,2-tetrachloroethane, pentachloroethane, 1,1-dichloroethylene, 1,2-dichloroethylene, trichloroethylene, tetrachloroethylene and 1,2-dichloropropane.

Now, the process for removing water of the present invention will be specifically described.

The process for removing water of the present invention comprises a dipping step of dipping an article having water attached on its surface, in a solvent composition to carry out removal of water, a specific gravity separation step of separating water from the solvent composition containing the water removed from the article, by a specific gravity separation method, and a filtration step of filtering the solvent composition having the water removed in the specific gravity separation step, through a coalescer type filter to further remove water remaining in the solvent composition.

In the dipping step, the article having water attached on its surface, is dipped in a dipping tank containing the solvent composition. Most of water attached on the article will be released from the surface of the article and will rise in the solvent composition and will reach the liquid surface. At the time of this dipping, at least one of ultrasonic cleaning, vibration cleaning and jet cleaning may be used in combination to accelerate the release of water from the surface of the article thereby to shorten the time required for the release. The time for dipping the article in the solvent composition is usually from 30 seconds to 10 minutes in many cases.

If water surfaced during dipping of the article will remain as it is at the liquid surface, such water is likely to be re-deposited on the surface of the article when the article is withdrawn from the solvent composition, thus causing stains after drying. Accordingly, it is necessary to remove the surfaced water out of the dipping step.

In the present invention, it is preferred to take out from the dipping step the solvent composition containing the water removed from the article, by permitting the solvent composition to overflow.

As a specific method, there may be mentioned a method wherein the liquid flow of the solvent composition is directed from one side of the liquid surface towards the other side to push out the mixture of the surfaced water and the solvent composition from the dipping step, or a method wherein the liquid flow of the solvent composition is directed from the bottom of the dipping tank towards the top thereby to push out the mixture of the surfaced water and the solvent composition from the dipping step.

Further, in a case where ultrasonic cleaning, vibration cleaning or jet cleaning is, for example, used in the dipping step, water detached from the article becomes fine water droplets and will be suspended as included in the solvent composition. Such suspension of the solvent composition is not desirable, since it causes stains on the surface of the article after drying by removal of water.

In the present invention, it is preferred that the temperature of the solvent composition in the dipping step is within a range of from a temperature lower by 10° C. than the boiling point of the solvent composition to less than the boiling point, particularly preferably within a range of from a temperature lower by 5° C. from the boiling point to less than the boiling point. Here, the boiling point is the azeotropic point in a case where the solvent composition is an azeotropic composition or a azeotrope-like composition. Otherwise, in a case where the solvent composition is not an azeotropic composition, it is at least one boiling point selected from the boiling points of HCFC, HFC and HFE.

By controlling the temperature of the solvent composition within the above range, suspension of the solvent composition can be suppressed, even if it is once suspended, the suspension may be resolved. The effect for suppressing suspension or the effect of resolving the suspension, is remarkable as the temperature is high.

Further, in a case where it is difficult to completely prevent suspension of water merely by controlling the temperature of the solvent composition, it is preferred to supply a fresh solvent composition to the dipping step to push out the suspended solvent composition from the dipping tank, whereby it is possible to completely eliminate the suspension in the dipping step or to maintain it at a lower level. As the fresh solvent composition to be supplied, it is preferred to re-use the solvent composition having water sufficiently removed via the specific gravity separation step or the filtration step.

In the specific gravity separation step, the solvent composition containing water, discharged from the dipping tank, is separated into water and the solvent composition by a specific gravity separation method. The solvent composition in the present invention has a specific gravity larger than water, and water will be scarcely dissolved in HCFC, HFC or HFE. Accordingly, if the solvent composition containing water, introduced into the specific gravity separation step, is left to stand still, an upper layer composed of water having the alcohol dissolved therein, and a lower layer composed of the solvent composition, will be separated. The time for being left to stand still is usually from 1 to 30 minutes. After being separated into two layers, the lower layer is sent to the filtration step, and the upper layer is discharged.

Here, the upper layer composed mainly of water, contains very small amounts of HCFC, HFC or HFE in addition to the alcohol. Such a component may be recovered by such a means as distillation or pervaporation and may be re-used.

Further, the temperature of the solvent composition in the specific gravity separation step is preferably within a range of from a temperature lower by 10° C. than the boiling point of the solvent composition to less than the boiling point, particularly preferably within a range of from a temperature lower by 5° C. than the boiling point to less than the boiling point, with a view to carrying out the separation easily and quickly. Here, the boiling point is the azeotropic point in a case where the solvent composition is an azeotropic composition or a azeotrope-like composition. Otherwise, when the solvent composition is not an azeotropic composition, the boiling point is at least one boiling point selected from the boiling points of HCFC, HFC and HFE.

Then, in the filtration step, the solvent composition having water separated in the specific gravity separation step, is filtered through a coalescer type filter, whereby water taken into the solvent composition, which was not separated in the specific gravity separation step, will be aggregated, so that it can be separated and removed by specific gravity separation.

In the present invention, with a view to effectively utilizing the solvent composition, it is preferred to return the solvent composition obtained via the filtration step to the dipping step. It is particularly preferred to use it as a liquid flow which is introduced to remove water surfaced to the liquid surface in the dipping step.

Further, it is preferred that water aggregated in the filtration step and separated from the solvent composition, is sent to the specific gravity separation step and discharged from the specific gravity separation step. It is thereby unnecessary to further provide a separation step after the filtration step, whereby it is possible to accomplish downsizing of the apparatus.

In the present invention, the article having water attached on its surface, is dipped in the solvent composition, and withdrawn from the dipping tank after the water is detached and removed from the liquid surface in the dipping tank. On the surface of the article after removal of water, only the solvent composition for removal of water, is attached, and such can easily be dried.

However, in a case where the heat capacity of the article is small, and the temperature in the dipping step is not sufficiently high, the temperature of the article will be decreased by the amount of heat lost by evaporation of the solvent composition attached to the surface of the article. Consequently, if the temperature at the surface of the article becomes lower than the ambient temperature, there may be a phenomenon such that moisture in the atmosphere will be condensed, or the solvent composition attached to the surface of the article will absorb moisture in the atmosphere before it is evaporated, whereby stains may sometimes be formed on the surface of the article.

Therefore, for the purpose of preventing such a problem, the process for removing water of the present invention preferably includes an exposure step of exposing the article to the vapor of the solvent composition after the dipping step.

In the exposure step, the vapor of the solvent composition is condensed to carry out rinsing of the surface of the article during a period until the temperature of the surface of the article reaches the boiling point of the solvent composition for removal of water, and at the same time, the temperature of the article is raised. After the temperature of the surface of the article reaches the boiling point of the solvent composition, the article is withdrawn from the exposure step, whereby taking out of the solvent composition in a liquid state, can be minimized. Accordingly, the surface of the article to be cleaned will easily and quickly be in a dried state after taken out from the exposure step.

Transportation of the article from the dipping step to the exposure step, is preferably carried out in an atmosphere of vapor of the solvent composition in order to prevent partial drying during the transportation or to prevent a cause for formation of stains e.g. by absorption of ambient moisture.

The solvent composition to be used in the exposure step may, for example, be the solvent composition constituting the lower layer via the specific gravity separation step, or a solvent composition via the filtration separation step. The supply of the vapor of the solvent composition may be continuously or intermittent.

Water attached to the article will finally be discharged mainly from the specific gravity separation step, but the water to be discharged contains a substantial amount of the alcohol. Therefore, the content of alcohol in the solvent composition gradually decreases. Accordingly, in order to carry out the present invention continuously, it is necessary to suitably supplement the alcohol to the liquid composition in the dipping step.

For this purpose, it is necessary to grasp the content of the alcohol in the solvent composition. Here, the specific gravity of the alcohol is about 0.8, while the specific gravity of HCFC, HFC or HFE to be used in the present invention exceeds 1, and large one may be about 1.6. Therefore, by measuring the specific gravity as the case requires, the content of the alcohol can be specified. In a case where a decrease in the concentration of the alcohol is confirmed by the measurement of the specific gravity, it is easy to adjust the content of the alcohol by adding a fresh alcohol or a recovered alcohol.

The process for removing water of the present invention can be carried out by using an apparatus for removing water, which comprises a dipping tank for storing a solvent composition comprising at least one member selected from a hydrochlorofluorocarbon, a hydrofluorocarbon and a hydrofluoroether, and an alcohol, as the essential components, and for dipping an article having water attached on its surface in the solvent composition to carry out removal of water, a specific gravity separation tank for separating water from the solvent composition containing the water removed from the article by a specific gravity separation method, and a coalescer type filter for filtering the solvent composition having the water removed in the specific gravity separation step, to further remove water remaining in the solvent composition.

With a view to effectively utilizing the solvent composition, such an apparatus preferably has a recycling means to return the solvent composition obtained by filtration through the coalescer type filter, to the dipping tank. Further, for the purpose of downsizing the apparatus, such an apparatus preferably has a means to return water separated from the solvent composition by filtration through the coalescer type filter, to the specific gravity separation tank.

Now, the present invention will be described in further detail with reference to Examples. Examples 1 to 6 are Working Examples of the present invention, and Examples 7 and 8 are Comparative Examples.

Cleaning tests for removal of water in Examples 1 to 6 were carried out by using the apparatus shown in FIG. 1. This apparatus is constituted by a dipping tank 1 provided with an ultrasonic vibrator 7 to carry out the dipping step, a specific gravity separation tank 2 to carry out the specific gravity separation step, a vapor-generating tank 4 to generate vapor for the exposure step, and a filtration separator 3 provided with a coalescer type filter, and capacities of the respective tanks are such that the dipping tank 1 has a capacity of 18 L, the specific gravity separation tank 2 has a capacity of 15 L, and the vapor-generating tank 4 has a capacity of from 10 to 20 L.

The solvent composition in the specific gravity separation tank 2 is suctioned by a pump 5 from the bottom of the specific gravity separation tank 2 and sent to the filtration separator 3. The solvent composition passing through the filtration separator 3 and having the water removed, is returned to the dipping tank 1 at a rate of about 2 L/min, and the solvent composition containing water is returned from the top of the side surface of the filtration separator 3 to the specific gravity separation tank 2 at a rate of about 1 L/min. From the filtration separator 3, the solvent composition is supplied, whereby the solvent composition overflows from the dipping tank 1 to the trough 6, and flows into the specific gravity separation tank 2 from the bottom of the trough 6. In a case where an article having water attached on its surface is practically dipped in the dipping tank 1, water will surface to the liquid surface of the solvent composition, whereby the liquid overflowing to the trough 6 will be a mixed liquid of the surfaced water and the solvent composition. At an upper portion of the apparatus, cooling pipes 8 and a trough 9 to receive the solvent composition thereby condensed, and the solvent entered into the trough 9 will be supplied to the specific gravity separation tank 2.

Adjustment of the temperature of the solvent composition in the dipping tank 1 or the specific gravity separation tank 2 was carried out by controlling the electric current supplied to the heater 10 or 11. Further, in a case where the exposure step by vapor is to be carried out, an electric current is supplied to the heater 12 of the vapor-generating tank 4 to bring the solvent composition to a boiling state thereby to generate vapor. The vapor generated will be contacted to the cooling pipe 8 and condensed, and the condensed composition will enter into the trough 9 and then will enter into the specific gravity separation tank 2.

EXAMPLE 1

As articles having water attached on their surfaces, five glass plates of 50 mm×50 mm×5 mm set up in a stainless steel basket, dipped in pure water and then withdrawn, were used. As the solvent composition, a solvent mixture (boiling point: 55° C., hereinafter referred to as solvent mixture A) comprising 95.6 mass % of 1,3-dichloro-1,1,2,2,3-pentafluoropropane and 4.4 mass % of ethanol, was used, and cleaning of the glass plates to remove water was carried out 48 times at a rate of once for every 10 minutes (total: 8 hours) under the following conditions:

Temperature of solvent mixture A in dipping tank 1:
46 to 51° C.
Use of ultrasonic vibrator 7 in dipping tank 1:
Yes
Dipping time of articles in dipping tank 1:
2 Minutes
Temperature of solvent mixture A in specific gravity separation tank 2: 46 to 51° C.
Exposure to vapor: 1 Minute The glass plates subjected to final cleaning to remove water were dried immediately after being withdrawn from the dipping tank 1, whereby no stains were observed. Further, no suspension of water in the solvent composition in the dipping tank 1 was observed.

EXAMPLE 2

As articles having water attached on their surfaces, ten brass plates of 25 mm×30 mm×2 mm set up in a stainless steel basket, dipped in pure water and then withdrawn, were used. As the solvent composition, a solvent mixture (boiling point: 52° C., hereinafter referred to as solvent mixture B) comprising 41.1 mass % of 3,3-dichloro-1,1,1,2,2-pentafluoropropane, 54.4 mass % of 1,3-dichloro-1,1,2,2,3-pentafluoropropane and 4.5 mass % of ethanol, was used, and cleaning of the brass plates to remove water was carried out 48 times at a rate of once for every 10 minutes (total: 8 hours) under the following conditions:

Temperature of solvent mixture B in dipping tank 1:
45° C.
Use of ultrasonic vibrator 7 in dipping tank 1:
Yes
Dipping time of articles in dipping tank 1:
2 Minutes
Temperature of solvent mixture B in specific gravity separation tank 2: 45° C.

Exposure to vapor: 2 Minutes

The brass plates subjected to the final cleaning to remove water were dried immediately after being withdrawn from the dipping tank 1, whereby no stains were observed. Further, no suspension of water in the solvent composition in the dipping tank 1 was observed.

EXAMPLE 3

As articles having water attached on their surfaces, five acrylic resin plates of 50 mm×50 mm×5 mm set up in a stainless steel basket, dipped in pure water and then withdrawn, were used. As the solvent composition, a solvent mixture (boiling point: 52° C., hereinafter referred to as solvent mixture C) comprising 97 mass % of 1,1,1,2,2,3,4,5,5,5-decafluoropentane and 3 mass % of 2-propanol, was used, and cleaning of the acrylic resin plates was carried out 48 times at a rate of once for every 10 minutes (total: 8 hours) under the following conditions:

Temperature of solvent mixture C in dipping tank 1:
45° C.
Use of ultrasonic vibrator 7 in dipping tank 1:
No
Dipping time of articles in dipping tank 1:
2 Minutes
Temperature of solvent mixture C in specific gravity separation tank 2: 45° C.
Exposure to vapor: 1 Minute The acrylic resin plates subjected to final cleaning to remove water were dried immediately after being withdrawn from the dipping tank 1, whereby no stains were observed. Further, no suspension of water in the solvent composition in the dipping tank 1 was observed.

EXAMPLE 4

As articles having water attached on their surfaces, five glass plates of 50 mm×50 mm×5 mm set up in a stainless steel basket, dipped in pure water and then withdrawn, were used. As the solvent composition, a solvent mixture (boiling point: 48° C., hereinafter referred to as solvent mixture D) comprising 94 mass % of 1,1,1,2,2,3,4,5,5,5-decafluoropentane and 6 mass % of methanol, was used, and cleaning of the glass plates to remove water was carried out 48 times at a rate of once for every 10 minutes (total: 8 hours) under the following conditions:

Temperature of solvent mixture D in dipping tank 1:
40° C.
Use of ultrasonic vibrator 7 in dipping tank 1:
Yes
Dipping time of articles in dipping tank 1:
2 Minutes
Temperature of solvent mixture D in specific gravity separation tank 2: 40° C.
Exposure to vapor: 1 Minute The glass plates subjected to final cleaning to remove water were dried immediately after being withdrawn from the dipping tank 1, whereby no stains were observed. Further, no suspension of water in the solvent composition in the dipping tank 1 was observed.

EXAMPLE 5

Cleaning of glass plates to remove water was carried out in the same manner as in Example 4 except that as the solvent composition to remove water, a solvent mixture (boiling point 54° C., hereinafter referred to as solvent mixture E) comprising 94 mass % of 1,1,2,2-tetrafluoroethyl-2,2,2-trifluoroethyl ether and 6 mass % of ethanol, was used, and the temperatures of solvent mixture E in the dipping tank 1 and solvent mixture D in the specific gravity separation tank 2 were 45° C., respectively.

The glass plates subjected to final cleaning to remove water were dried immediately after being withdrawn from the dipping tank 1, whereby no stains were observed. Further, no suspension of water in the solvent composition in the dipping tank 1 was observed.

EXAMPLE 6

Cleaning of glass plates to remove water was carried out in the same manner as in Example 4 except that as the solvent composition to remove water, a solvent mixture (boiling point 55° C., hereinafter referred to as solvent mixture F) comprising 95 mass % of (perfluorobutoxy)methane and 5 mass % of 2-propanol, was used, and the temperatures of solvent mixture E in the dipping tank 1 and solvent mixture D in the specific gravity separation tank 2 were 48° C., respectively.

The glass plates subjected to final cleaning to remove water were dried immediately after being withdrawn from the dipping tank 1, whereby no stains were observed. Further, no suspension of water in the solvent composition in the dipping tank 1 was observed.

EXAMPLE 7(COMPARATIVE EXAMPLE)

Cleaning of glass plates to remove water was carried out in the same manner as in Example 5 except that the filtration separator 3 in FIG. 1 was dismounted, and the solvent mixture E withdrawn from the bottom of the specific gravity separation tank 2 was returned as it was to the dipping tank 1. Immediately after initiation of the cleaning, no stains were observed when the glass plates were dried immediately after being withdrawn from the dipping tank 1, but upon expiration of about 2 hours from the initiation of the cleaning, suspension of water in the solvent mixture E in the dipping tank 1 started to be observed, and substantially at the same time, stains started to form on the glass plates after removal of water.

EXAMPLE 8(COMPARATIVE EXAMPLE)

Cleaning of glass plates to remove water was carried out in the same manner as in Example 6 except that the filtration separator 3 in FIG. 1 was dismounted, and the solvent mixture E withdrawn from the bottom of the specific gravity separation tank 2 was returned as it was to the dipping tank 1. Immediately after initiation of the cleaning, no stains were observed when the glass plates were dried immediately after being withdrawn from the dipping tank 1, but upon expiration of about 1 hour from the initiation of the cleaning, suspension of water in the solvent mixture E in the dipping tank 1 started to be observed, and substantially at the same time, stains started to form on the glass plates after removal of water.

INDUSTRIAL APPLICABILITY

The present invention can be applied to cleaning of articles made of metal, plastic, glass, ceramics, etc., which are articles to be used for various applications, such as wafers to be used for the production of semiconductors such as IC, LSI, etc., masks to be used for photolithography, plated products, optical components such as lenses, components of liquid crystal display devices and various electronic components.

The entire disclosure of Japanese Patent Application No. 2004-048427 filed on Feb. 24, 2004 including specification, claims, drawings and summary is incorporated herein by reference in its entirety.

What is claimed is:

1. A process for removing water, which comprises dipping an article having water attached on its surface, in a solvent composition comprising (1) at least one member selected from a hydrochlorofluorocarbon, a hydrofluorocarbon and a hydrofluoroether, and (2) at least one alcohol, to carry out removal of water (dipping step), separating water from the solvent composition containing the water removed from the article, by a specific gravity separation method (specific gravity separation step), and filtering the solvent composition having the water removed in the specific gravity separation step, through a coalescer type filter to further remove water remaining in the solvent composition (filtration step).

2. The process for removing water according to claim 1, which includes taking out from the dipping step the solvent composition containing the water removed from the article, by permitting the solvent composition to overflow (taking out step).

3. The process for removing water according to claim 1, which includes returning the solvent composition obtained via the filtration step to the dipping step (returning step).

4. The process for removing water according to claim 1, wherein the temperature of the solvent composition containing the water removed from the article in the specific gravity separation method, is within a range of from a temperature lower by 10° C. than the boiling point to less than the boiling point, wherein said boiling point is of the solvent composition when it is an azeotrope and is of component (1) when the solvent composition is not an azeotrope.

5. The process for removing water according to claim 1, wherein the hydrochlorofluorocarbon is present and is at least one member selected from the group consisting of 1,1-dichloro- 1-fluoroethane, 3,3-dichloro-1,1,1,2,2-pentafluoropropane and 1,3-dichloro-1,1,2,2,3-pentafluoropropane.

6. The process for removing water according to claim 1, wherein the hydrofluorocarbon is present and is at least one member selected from the group consisting of 1,1,1,3,3-pentafluorobutane, 1,1,1,2,2,3,4,5,5,5-decafluoropentane, 1,1,1,2,2,3,3,4,4-nonafluorohexane, 2-trifluoromethyl-1,1,1,2,3,4,5,5,5-nonafluoropentane and 1,1,1,2,2,3,3,4,4,5,5,6,6-tridecafluorohexane.

7. The process for removing water according to claim 1, wherein the hydrofluoroether is present and is at least one member selected from the group consisting of 1,1,2,2-tetrafluoroethyl-2,2,2-trifluoroethyl ether, 2,2,3,3-tetrafluoro-1-(1,1,2,2-tetrafluoroethoxy)propane, (perfluorobutoxy)methane and (perfluorobutoxy)ethane.

8. The process for removing water according to claim 1, wherein the alcohol is a $C_{1-4}$ alkanol.

9. The process for removing water according to claim 1, wherein the alcohol is at least one of methanol, ethanol and isopropanol.

10. The process for removing water according to claim 1, wherein the content of the alcohol is from 3 to 15 mass % of the solvent composition.

11. The process for removing water according to claim 1, wherein the solvent composition is an azeotropic composition.

12. The process for removing water according to claim 1, wherein the dipping step is carried out for from 30 seconds to 10 minutes.

13. The process for removing water according to claim 1, wherein the dipping step is carried out at a temperature within a range of from a temperature lower by 5° C. than the boiling point to less than the boiling point, wherein said boiling point is of the solvent composition when it is an azeotrope and is of component (1) when the solvent composition is not an azeotrope.

14. The process for removing water according to claim 1, wherein the temperature of the solvent composition containing the water removed from the article in the specific gravity separation method, is within a range of from a temperature lower by 5° C. than the boiling point to less than the boiling point, wherein said boiling point is of the solvent composition when it is an azeotrope and is of component (1) when the solvent composition is not an azeotrope.

15. The process for removing water according to claim 1, which additionally comprises exposing the article after the dipping step to vapor of the solvent composition (exposing step).

* * * * *